United States Patent [19]

Méneguz

[11] 4,149,672
[45] Apr. 17, 1979

[54] APPARATUS FOR MIXING COLD AND HOT WATER, AND FOR DISTRIBUTING THE WATER MIXTURE

[75] Inventor: Rémy Méneguz, Bereldange, Luxembourg

[73] Assignee: Parcinter S.A., Luxembourg

[21] Appl. No.: 834,403

[22] Filed: Sep. 19, 1977

[30] Foreign Application Priority Data

Sep. 28, 1976 [LU] Luxembourg ............ 76886

[51] Int. Cl.² .................................... G05D 23/00
[52] U.S. Cl. ................................. 236/12 A
[58] Field of Search ............ 236/12 A, 80 B; 137/90

[56] References Cited

U.S. PATENT DOCUMENTS

| 2,449,766 | 9/1948 | Brown | 137/90 X |
| 2,517,056 | 8/1950 | Trubert | 236/12 A |
| 2,893,637 | 7/1959 | Trubert | 236/12 A |

FOREIGN PATENT DOCUMENTS 494298  7/1953  Canada ................... 137/90

*Primary Examiner*—Dorsey Newton
*Attorney, Agent, or Firm*—Kurt Kelman

[57] ABSTRACT

A cold and hot water mixing faucet comprises an inlet valve each for the cold and hot water to deliver cold and hot water to a mixing chamber. Each valve includes a valve housing and a membrane thereon and defining a counterpressure chamber therewith. The membrane is movable between an open position and a closed position for selective supply of water to the mixing chamber, and a conduit interconnects each counterpressure chamber and the mixing chamber. A thermostatically-controlled water distribution control device is associated with the conduits and is arranged for actuation of each inlet valve in inverse directions to maintain a predetermined water temperature in the mixing chamber. A water flow blocking device is associated with each valve conduits upstream of the thermostatically-controlled device and is actuatable independently of the control device for blocking the flow of water through the conduits of both valves to prevent escape of water from the counterpressure chambers whereby the pressure in the counterpressure chambers increases until it presses the membranes into the closed position without actuation by the water distribution control device.

10 Claims, 10 Drawing Figures

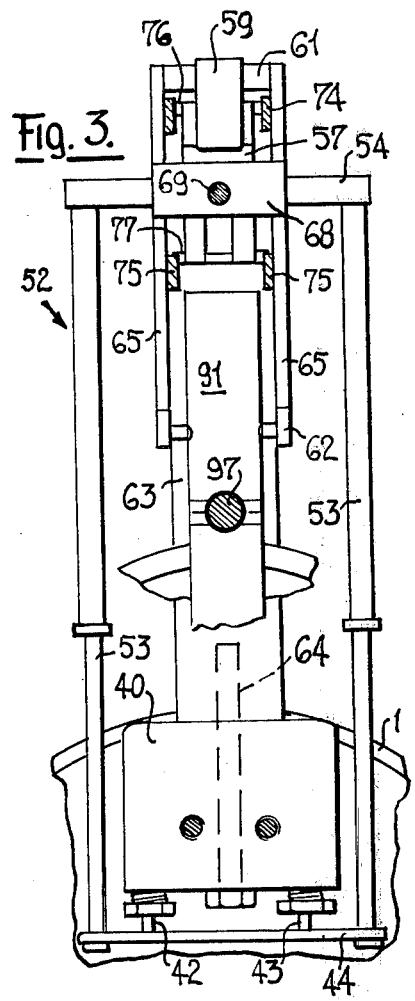
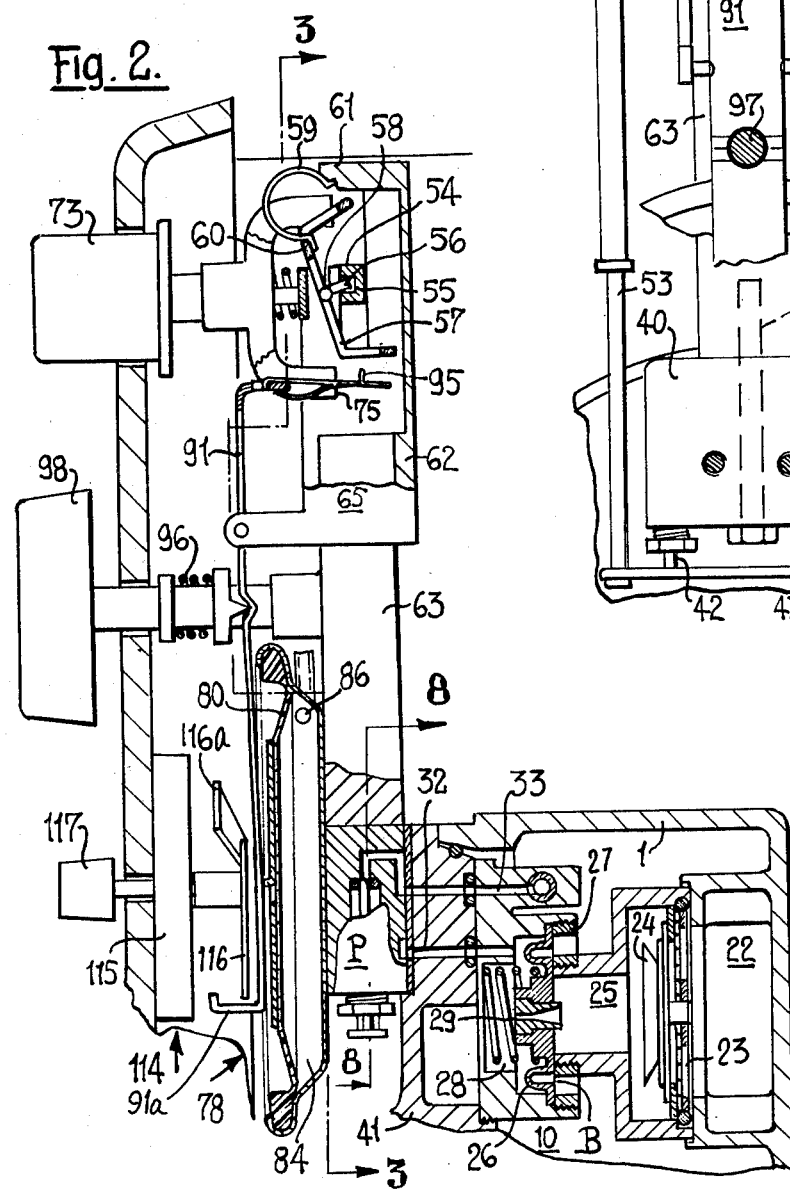

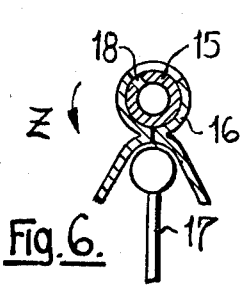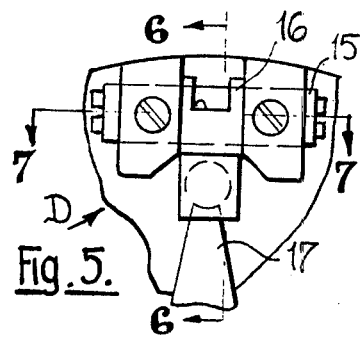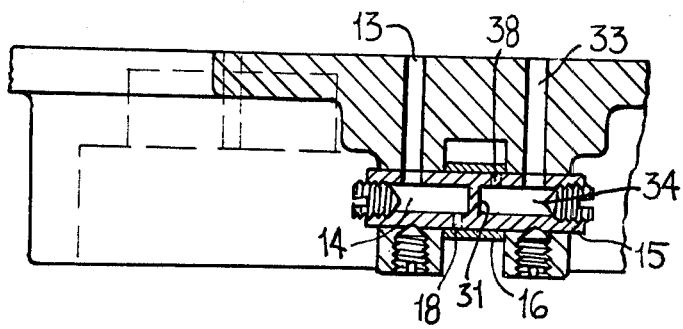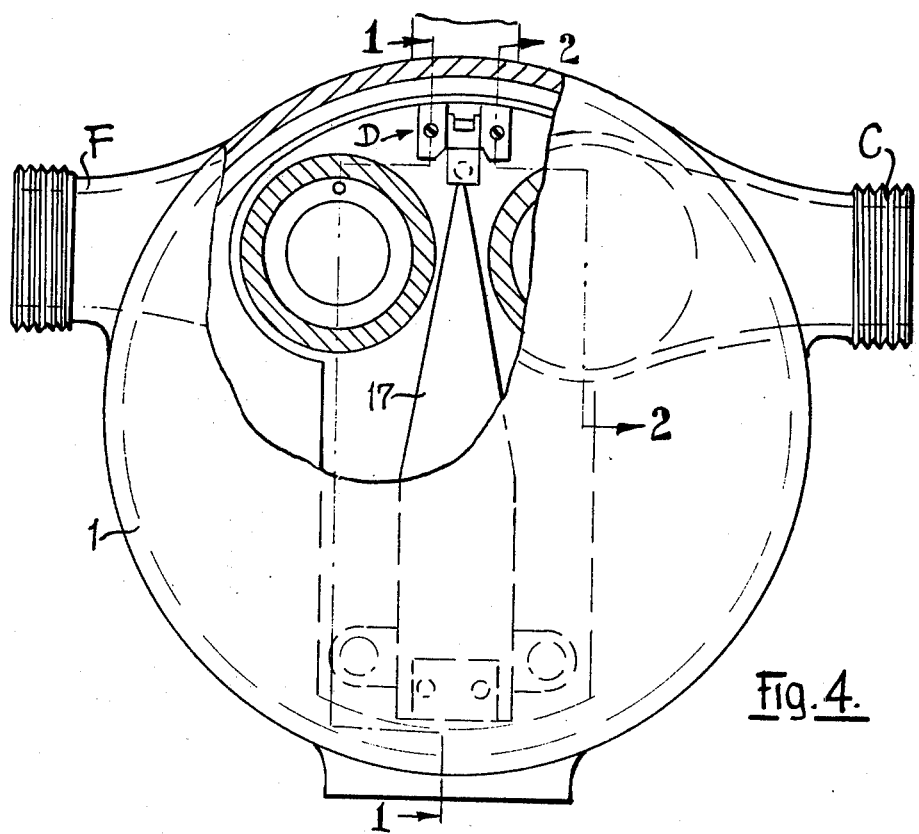

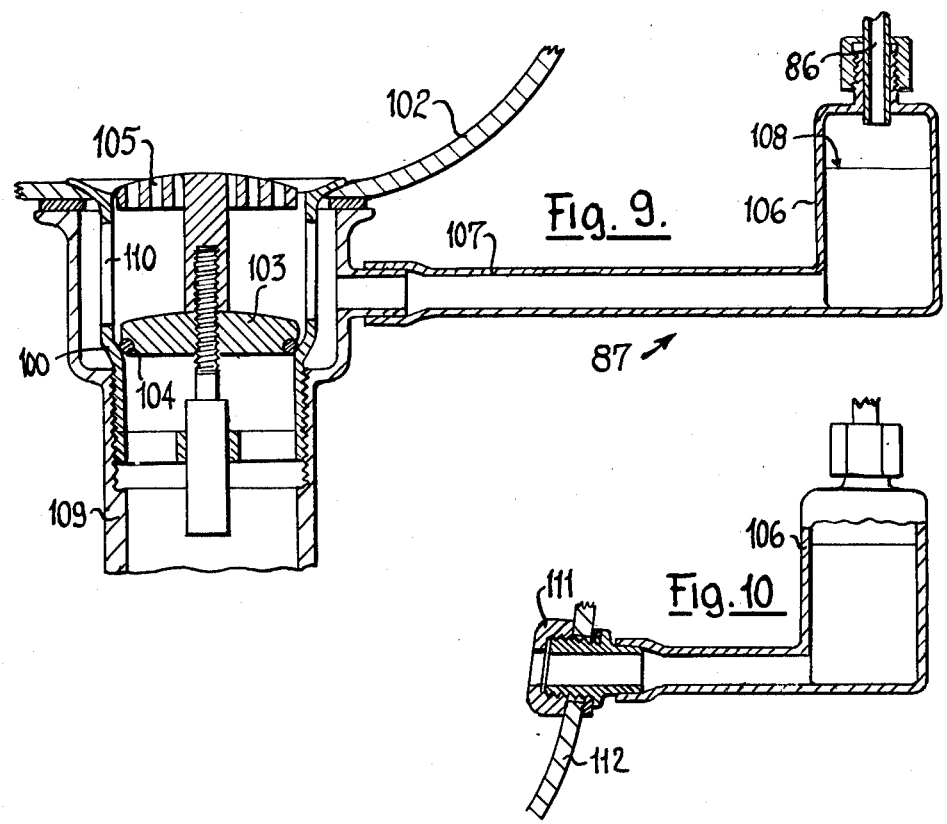
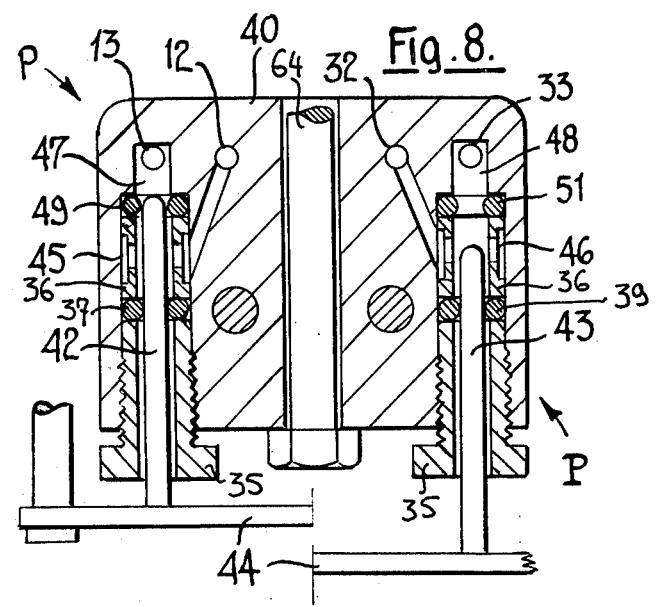

APPARATUS FOR MIXING COLD AND HOT WATER, AND FOR DISTRIBUTING THE WATER MIXTURE

The present invention relates to improvements in an apparatus for mixing cold and hot water, and for distributing the water mixture.

Known apparatus of this type comprises a housing defining a mixing chamber and having an inlet for cold water, an inlet for hot water, and an outlet for the mixed water from the mixing chamber into a receptacle. In such apparatus, an inlet valve for the cold water and an inlet valve for the hot water are mounted in the housing between a respective one of the inlets and the mixing chamber, and each inlet valve includes a valve housing, a membrane on the housing and facing the respective inlet, the valve housing and membrane defining therebetween a counterpressure chamber, the membrane being movable between an open position wherein the inlet is in communication with the mixing chamber and a closed position wherein the inlet is shut off from the mixing chamber, and conduit means of variable cross sections interconnecting the counterpressure chamber and the mixing chamber. A thermostatically-controlled control device regulates the water distribution.

In a known water mixing apparatus of this structure, the thermostatically-controlled water distribution control device comprises a bimetallic blade mounted for displacement in a space between a cold water nozzle and a hot water nozzle downstream of the conduit means leading from the counterpressure chambers. This blade constitutes an adjustable water flow blocking device for one or the other nozzle and flow of mixed water is blocked by a manual control causing the two nozzles to move closer to each other, one nozzle being fixed while the other is displaceable. Both nozzles are thus blocked by the blade and all water flow ceases. Therefore, in this known apparatus, control of the mixed water flow is coupled to the thermostatic control and stoppage of this flow causes decontrol of the temperature.

It is a primary object of this invention to provide an apparatus of this general type wherein water flow may be stopped independently of the thermostatic control and both inlet valves may be closed by an increase of the pressure in the counterpressure chambers without interfering with the temperature regulation of the mixed water.

The above and other objects are accomplished according to the invention with a thermostatically-controlled water distribution control device associated with the conduit means and arranged for actuation of the inlet valves in inverse directions, the device opening one of the inlet valves wider while correspondingly closing the other inlet valve, and vice versa, to maintain a predetermined water temperature in the mixing chamber, and a water flow blocking device associated with the conduit means of each inlet valve upstream of the thermostatically-controlled device and operable independently of the control device for blocking the flow of water through the conduit means of both inlet valves to prevent escape of water from the counterpressure chambers whereby the pressure in the counterpressure chambers increases until it presses the membranes into the closed position without actuation by the water distribution control device.

The above and other objects, advantages and features of the present invention will become more apparent from the following description of a now preferred embodiment thereof, taken in conjunction with the accompanying drawing wherein FIG. 1 is a side elevational view, partly in section along line 1—1 of FIG. 4 in the lower portion thereof and partly in axial section in the upper portion, showing the cold water flow of a water mixing apparatus according to this invention;

FIG. 2 is an analogous view showing the hot water flow, the lower portion being a section along line 2—2 of FIG. 4;

FIG. 3 is a front elevational view of the water flow blocking device, taken as a section along line 3—3 of FIG. 2;

FIG. 4 is a rear elevational view of the lower portion of the apparatus, seen in the direction of arrow G of FIG. 1 and showing the interior in a partial section along line 4—4 of FIG. 1;

FIG. 5 is a detailed view of the thermostatic water distribution control device, on an enlarged scale;

Figure 1:
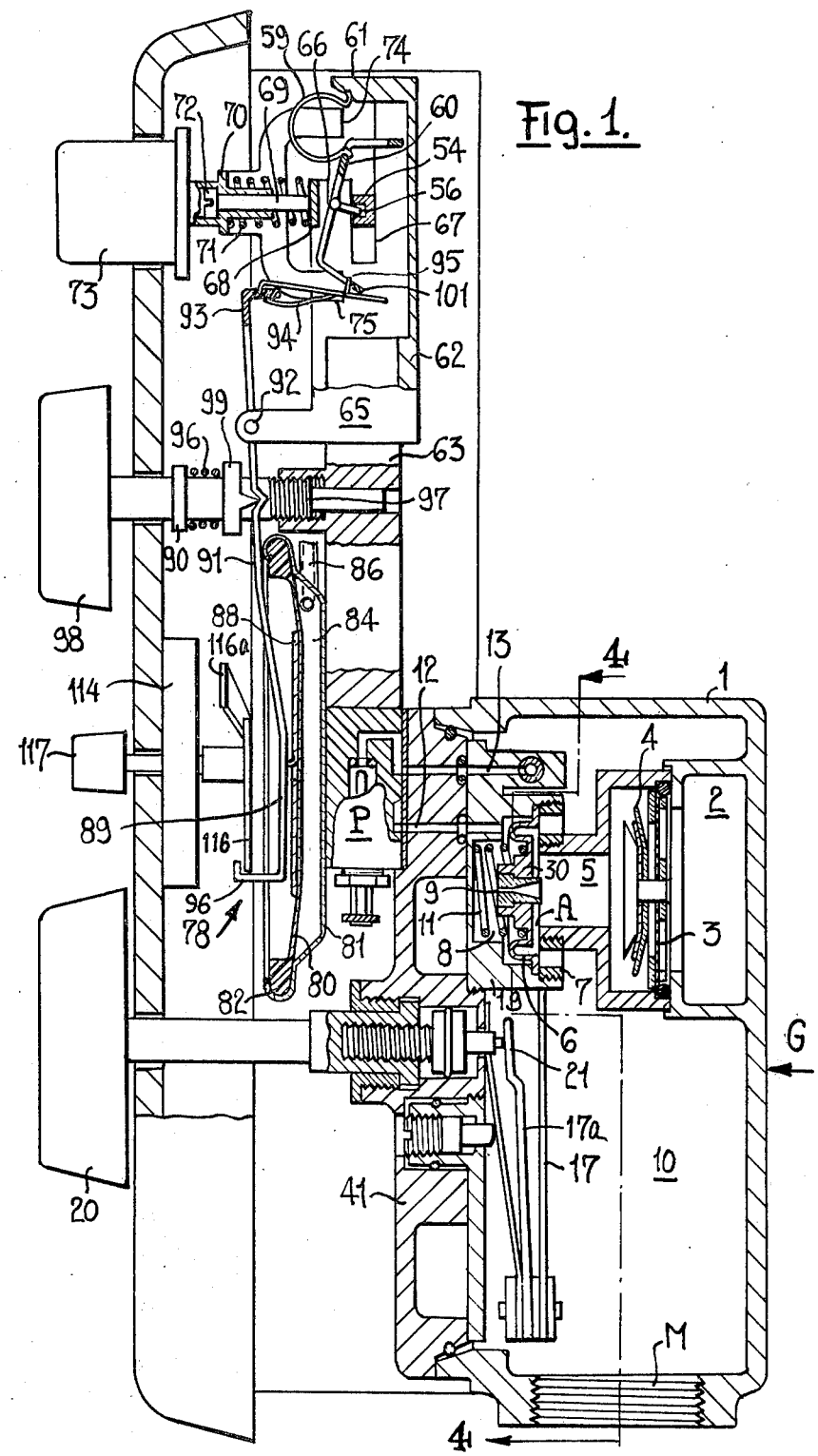

FIGS. 6 and 7 are respective sections along line 6—6 and line 7—7 of FIG. 5;

FIG. 8 is an enlarged view of the water flow blocking device, in a section taken approximately along line 8—8 of FIG. 2, the two rods of the device being shown in different operating positions;

FIG. 9 is a sectional view of one embodiment of a water level sensing device attached to a bathtub to which the apparatus delivers a mixture of cold and hot water; and FIG. 10 is a view similar to that of FIG. 9, showing another embodiment of a water level sensing device.

Referring now to the drawing and first to FIGS. 1 to 4, there is shown housing 1 defining mixing chamber 10 and having inlet F for cold water, inlet C for hot water, and outlet M for the mixed water from mixing chamber 10 into a receptacle, such as bathtub 102 (see FIG. 9). The cold water inlet comprises conduit 2 in communication with tubular conduit 5. Filter 3 and non-return valve 4 are mounted between conduit 2 and tubular conduit 5.

Inlet valve A for the cold water is mounted in housing 1 between the inlet F, 2, 5 and mixing chamber 10, and includes valve housing 19 and annular membrane 6 mounted on the housing and facing the inlet, the valve housing and membrane defining counterpressure chamber 8 therebetween. The membrane is mounted on the valve housing by having its periphery clamped thereto by means of a perforated gasket ring 7, the ring threadedly engaging the valve housing as well as the end of tubular conduit 5 which serves as a valve seat. The annular membrane is attached to central valve member 30 supported on compression spring 11 arranged in counterpressure chamber 8 and engaging a shoulder of valve member 30 whereby the valve member and membrane are movable between an open position, wherein the pressure of the cold water entering through the inlet exceeds that of spring 11 and that prevailing in the counterpressure chamber, and a closed position, wherein the pressure prevailing in the counterpressure chamber exceeds that of the entering water. In the open position, the inlet is in communication with mixing chamber 10 through the perforations in gasket ring 7 and, in the closed position, the inlet is shut off from the mixing chamber. FIG. 1 illustrates the open valve position while FIG. 2 shows the closed position. Venturi nozzle 9 of small cross section is mounted in valve member 30 to feed water to the counterpressure chamber.

In the open position of the valve shown in FIG. 1, cold water will be delivered into mixing chamber 10 where it is mixed with the hot water supplied in a like manner, as will be explained hereinafter in connection with FIG. 2, and delivered to outlet M which may be connected to a bathtub faucet which may be arranged for selective delivery of the mixed water to the bathtub or to a showerhead, if desired. Upon displacement of membrane 6 to the right, as seen in FIG. 1, the inlet valve is closed, the membrane preventing flow of water from conduit 5 through the perforations in gasket ring 7.

Conduit means 12, 13 extending partially through valve housing 19 and partially through cover 41 for housing 1 interconnects counterpressure chamber 8 and mixing chamber 10, the illustrated conduit means being comprised of upstream conduit portion 12 and downstream conduit portion 13 and enabling water contained in counterpressure chamber 8 to escape therefrom into mixing chamber 10.

Inlet valve B for the hot water is illustrated in FIG. 2 and is identical in structure and operation with above-described valve B. It is mounted in housing 1 between inlet C, 22, 25 and annular membrane 26, conduit 22 being in communication with tubular conduit 25, filter 23 and non-return valve 24 being mounted between conduit 22 and tubular conduit 25. The housing of valve B and membrane 26 mounted thereon define counterpressure chamber 28 therebetween, the periphery of the membrane being clamped to the valve housing by means of perforated gasket ring 27. Venturi nozzle 29 is mounted in the valve member to which the membrane is attached to feed water into counterpressure chamber 28. In the open position of the valve, hot water will be delivered into mixing chamber 10 where it is mixed with the cold water supplied through open valve A in a like manner. Upon displacement of membrane 26 to the right, as shown in FIG. 2, the inlet valve B is closed.

Conduit means 32, 33 extending partially through the valve housing and partially through cover 41 for housing 1 interconnects counterpressure chamber 28 and mixing chamber 10, the illustrated conduit means, identical to conduit means 12, 13, being comprised of upstream conduit portion 32 and downstream conduit portion 13.

According to the invention, water flow blocking device P is associated with the conduit means and is actuatable for blocking the flow of water through the conduit means to prevent escape of water from the counterpressure chamber whereby the pressure in the counterpressure chamber increases until it presses membrane 6 and 26 into the closed position.

Referring now to FIG. 8, the specific water flow blocking device P illustrated herein by way of example is mounted in block 40 affixed to cover 41 of housing 1. It comprises two rods 42 and 43 respectively movable into conduit means 12, 13 and 32, 33 of each inlet valve for blocking the flow of water therethrough. The two rods are arranged and guided for reciprocal movement in parallel bores in block 40. Each bore holds a guide sleeve 36 and a threaded bolt 35 defining an axial bore, the guide sleeves and axial bores of the bolts guiding rods 42 and 43. Gaskets 37 and 39 are inserted between the threaded bolts and guide sleeves, and gaskets 49 and 51 are inserted between the guide sleeves and a shoulder in the bores, tightening of the bolts assuring that the gasket will form fluid-tight seals for chambers 45 and 46 defined by the guide sleeves in the bores. As shown, upstream conduit portions 12 and 32 lead into bore chambers 45 and 46, respectively, while end chambers 47 and 48 in the bores communicate with downstream conduit portions 13 and 33, respectively. The gaskets and the rods form fluid-tight joints to separate the bore chambers from each other.

Rods 42 and 43 are mounted parallel to each other on transverse bar 44 for selective movement of the rods into an open position (shown on the right in FIG. 8) and a blocking position (shown in the figure on the left), the control of the movement of transverse bar 44 and the rods affixed thereto being described hereinafter. In the blocking position, the rods will block all water flow from the upstream to the downstream portion of the conduit means, thus preventing water from escaping counterpressure chambers 8 and 28. Since water will continue to seep into these chambers through nozzles 9 and 29, pressure will build up therein until the pressure, in cooperation with the compression spring in the chambers, presses the valve membranes into the closed position.

As shown in FIG. 3, transverse bar 44 forms part of mobile carrier 52 comprised of transverse bars 44 and 54 interconnecting struts 53. The device for operating water flow blocking device P, i.e., for moving the mobile carrier, comprises in the illustrated embodiment a rocking lever 57 which has a central arm 56 projecting from fulcrum axle 58 of the rocking lever into slot 55 in upper transverse bar 54 (see FIGS. 1 and 2). Rocking of lever 57 into its respective end positions shown in FIGS. 1 and 2, will move mobile carrier 52 up and down by action of pendulum arm 56 engaged in slot 55, thus moving rods 42 and 43 between the open and blocking positions.

Rocking lever 57 is thrust into its respective end positions by omega-shaped spring 59 held tensioned between shoulder 60 on the rocking lever and abutment 61 on an upper end of support cradle 62 disposed on pillar 63 affixed to block 40 by threaded bolt 64. The support cradle comprises parallel side plates 65 which define slots 66 (see FIG. 1) in which the ends of fulcrum axle 58 for rocking lever 57 are engaged so that the rocking lever is pivotally mounted on support cradle 62. The side plates of the support cradle have further elongated slots 67 glidably supporting upper transverse bar 54 which it is moved up and down by the rocking lever. Bridge member 68 extends between side plates 65 and supports bolt 69 projecting from the bridge member and glidably supporting stirrup 70. Compression spring 71 is mounted between bridge member 68 and stirrup 70 to maintain the same normally in first position, the outward movement of the stirrup being limited by head 72 of bolt 69. The stirrup is attached to, or integral with, push button 73 which enables the stirrup to be depressed into a second position. The stirrup has branches 74 and 75 which engage lateral abutments 76 and 77 of rocking lever 57 when the push button is depressed (FIGS. 1 and 3). In this manner, manual operation of push button 73 permits the rocking level to be moved between its respective end positions in which it is maintained by blade spring 59, thus holding water flow blocking device P in a selected open or blocking position.

According to the illustrated embodiment, rocking lever 57 may be disengaged from the stirrup holding the rocking lever in the end position causing blocking of the water flow by pressure-responsive disengagement device 78 which is responsive to a predetermined level of water sensed in the receptacle to which the mixed water is delivered.

The illustrated device FIGS. 1 and 2 for blocking further water flow when the water in the bathtub has reached a predetermined level comprises a resilient membrane 80, for instance of rubber, whose beaded rim 82 is clamped into the rolled-over periphery of casing 81 which defines a fluid-tight chamber 84 with the resilient membrane. FIG. 9 illustrates one embodiment of a device 87 for sensing the level of water in bathtub 102, this device being in communication with chamber 84 through conduit 86.

Resilient membrane 80 carries plate 88 supporting one end 89 of actuating lever 91 pivoted at fulcrum 92 which is journaled in projecting portions of side plates 65. The other lever ends 93 carries spring blade 94 which has an abutment capable of engaging rocking lever 57, as shown in FIG. 1. The operating lever is held with its end 89 against plate 88 on resilient membrane 80 under an adjustable pressure provided by compression spring 96. The compression spring is held on rod 97 threadedly engaged in a threaded bore in pillar 63 and the rod is rotatable by button 98 at its outer end. Compression spring 96 is held between abutment 90 affixed to rod 97 and abutment 99 glidable on the rod and having a wedge-shaped projection engaging a matching notch in operating lever 91. When the rod is turn by button 98, the bias of spring 96 changes and the pressure on the operating lever is thus adjustable. When the pressure in chamber 84 is relatively low, operating lever 91 assumes the position indicated in FIG. 1, in which abutment 95 of spring blade 94 engages shoulder 101 of rocking lever 57. Thus, the rocking lever is held in the end position which keeps the water flow blocking device open, i.e., transverse bar 44 is lowered into the position shown on the right in FIG. 8. When the pressure in chamber 84 exceeds that of spring 96, operating lever 91 is pivoted into the position shown in FIG. 2, wherein abutment 95 on blade spring 94 at the other end of the lever permits rocking lever 57 to assume its other end position shown in FIG. 2 during the displacement of abutment 95.

The pressure increase in chamber 84, i.e., the operation of the water flow blocking device, is responsive to water level sensing device 87 which is installed on bathtub 102. As shown, the device comprises socket 100 threadedly mounted in bathtub outlet pipe 109 and closed by closure plate 103 which may be seated on a shoulder in the socket by means of gasket 104. A perforated disc 105 is spaced from, and affixed to closure plate 103 to permit water from the tub to flow through the perforations in disc 105 into a chamber defined between plate 103 and disc 105 and out of ports 110 in socket 100, whence it enters an annular chamber between socket 100 and outlet pipe 109 which communicates with conduit 107 extending laterally therefrom. As soon as water begins to fill the tub, it flows through conduit 107 into connected chamber 106 where it soon establishes water level 108 which varies only slightly as the tub fills up with water. Experience has shown that the superatomspheric pressure in chamber 106 increases proportionally to the hydrostatic pressure in the bathtub, i.e., the water level therein, and this pressure is transmitted through conduit 86, which is attached to chamber 106, to chamber 84. When this pressure has reached a level sufficient to counteract the pressure of spring 96, it will move operating level 91 and cause further water flow to be blocked. The operating pressure may be adjusted by rotation of button 98 so that any desired water level in the bathtub may actuate pivoting of lever 91. When closure plate 103 is opened, all the water in the tub, in conduit 107 and chamber 106 flow out through outlet pipe 109.

A modified water level sensing device is shown in FIG. 10. In this embodiment, chamber 106 is connected directly to side wall 112 of the bathtub by means of fitting 111 near the bottom of the tub.

Sometimes, particularly when the shower is used, it may be desired to discontinue the water flow after a predetermined time, i.e. to provide a timed device 114 for operating water flow blocking device P. For this purpose, the device comprises a conventional timing mechanism mounted in box 115 and arranged to entrain inclined camming member 116 arranged to act upon end 89 of operating lever 91 after a period of time set by turning control button 117 of the timing mechanism. Depending on the set time, camming member 116 will be rotated into engagement with the lever end and will thus lift the lever end to pivot the operating lever into the position shown in FIG. 2. In this manner, the operation of the water flow blocking device is responsive not only to the water level in the tub and may also be timed, if desired.

In addition to water blocking device P according to the present invention, the illustrated apparatus, as shown in FIGS. 1, 2 and 4–7, also includes a thermostatically-controlled water distribution control device D, the operation of device P being independent of that of device D. This thermostatically-controlled device is arranged downstream from device P. As shown, downstream portions 13 and 33 of the conduit means connecting the counterpressure chambers of the inlet valves with mixing chamber 10 empty into axial bores 14 and 34, respectively, of fixed pipe section 15, the two axial bores being separated by septum 31. Rotatable sleeve 16 is mounted on pipe section 15, its annular position being controlled by bimetallic control element 17 mounted in mixing chamber 10 and sensing the temperature of the water therein. When the water temperature increases, sleeve 16 turns on pipe section 15 in the direction of arrow Z (FIG. 6), the sleeve having a port arranged to register with port 18 in pipe section 15 in communication with bore 14 whereby the port 18 is gradually increased in size, permitting more rapid emptying of counterpressure chamber 8 and correspondingly increased opening of cold water inlet valve A. At the same time, this rotation of sleeve 16 will cause port 38 in communication with bore 34 to be gradually decreased so that hot water delivery is decreased in proportion to the increase in cold water delivery, and vice versa. The position of bimetallic element 17 may be varied by means of button 20, rotation of the button causing abutment 21 bearing on limb 17a fixed to the base of element 17 to change the position of the element (see FIG. 1). In this manner, it is possible manually to regulate the temperature of the mixed water.

The above-described apparatus operates in the following manner:

When water flow blocking device P is in its rest position shown in FIG. 1, rods 42 and 43 are pulled out in the position shown on the right in FIG. 8 so hot and cold water flow into mixing chamber 10 whence they are delivered through outlet M at the desired temperature automatically controlled by thermostatically-operated water distributor device D. This desired temperature is set by operating button 20.

When the level of water in the bathtub has reached a desired level, controlled by button 98, pressure-responsive control 78 operates actuating lever 91 to disengage rocking lever 57 which is, therefore, released to move into its other end position by action of spring 59, thus moving the two rods of the water flow blocking device into the closed position shown on the left in FIG. 8. Since this prevents escape of water from counterpressure chambers 8 and 28, the rising pressure in these chambers will close inlet valves A and B, thus interrupting any flow of water into the bathtub.

Alternatively, the water flow blocking device may also be operated by timing device 114 which turns cam 116 from the illustrated inoperative position to another angular position (now shown) in which ramp 116a of the cam cooperates with rear nose 91a of operating lever 91, moving the nose to the left so that lever 91 moves from the position shown in FIG. 1, to that of FIG. 2 (as is also the case when pressure is admitted to chamber 84, as previously described), thus to stop the water flow after a time period set by operating button 117.

To start the water flow again, it suffices to press down button 73 which repositions rocking lever 57 into the position shown in FIG. 1, in which position operating lever 91 engages the rocking lever to hold it in the end position wherein the water flow blocking device is inoperative.

While the bathtub is being filled or during use of the shower, water flow may be interrupted manually at any time by pressing button 73, which brings rocking lever 57 into its operative end position shown in FIG. 2.

The apparatus has the advantage of enabling interruption of water flow selectively in response to the water level in the bathtub (pressure-sensitive device 78), to a timing device 114, or to manual operation (button 73), without in any way modifying the temperature control by device D. Thus, when water flow is re-established, it is not necessary to regulate the temperature again.

Furthermore, since the water flow blocking device acts on auxiliary conduits of small throughput, the entire mechanism may be readily installed on mixing chamber housing 1 under a common protective plate, being accommodated easily in a cavity of small depth not exceeding that of the wall covering. All parts of the mechanism are readily accessible and permit utilization of the apparatus under varying operating conditions. Since the water level is automatically controlled while the water temperature remains thermostatically regulated, appreciable energy savings are obtained without requiring the installation of expensive apparatus.

Obviously, many modifications and variations in the various operating devices will occur to those skilled in the art without departing from the scope of the invention as defined by the claims, particularly after benefitting from the present teaching. Thus, the reciprocable blocking rods 42 and 43 could be replaced by any suitable conduit blocking devices, such as a variety of valves with appropriate controls. Also, the blocking device may be controlled solely manually or automatically. The automatic control devices could be suitably programmed and electric control circuits could be used for the water level sensing device.

What is claimed is:

1. An apparatus for mixing cold and hot water, and for distributing the water mixture, which comprises
   (a) a housing defining a mixing chamber and having an inlet for cold water, an inlet for hot water, and an outlet for the mixed water from the mixing chamber into a receptacle,
   (b) an inlet valve for the cold water and an inlet valve for the hot water, each inlet valve being mounted in the housing between a respective one of the inlets and the mixing chamber and each inlet valve including
      (1) a valve housing,
      (2) a membrane mounted on the housing and facing the respective inlet, the valve housing and membrane defining a counterpressure chamber therebetween, the membrane being movable between an open position wherein the inlet is in communication with the mixing chamber and a closed position wherein the inlet is shut off from the mixing chamber, and
      (3) conduit means interconnecting the counterpressure chamber and the mixing chamber,
   (c) a thermostatically-controlled water distribution control device associated with the conduit means and arranged for actuation of the inlet valves in inverse directions, the device opening one of the inlet valves wider while correspondingly closing the other inlet valve, and vice versa, to maintain a predetermined water temperature in the mixing chamber, and
   (d) a water flow blocking device associated with the conduit means of each inlet valve upstream of the thermostatically-controlled device and operable independently of the control device for blocking the flow of water through the conduit means of both inlet valves to prevent escape of water from the counterpressure chambers whereby the pressure in the counterpressure chambers increases until it presses the membranes into the closed position without actuation by the water distribution control device.

2. The cold and hot water mixing apparatus of claim 1, further comprising a timing device for operating the water flow blocking device after a predetermined time period.

3. The cold and hot water mixing apparatus of claim 1, further comprising a block mounted on the housing and the water flow blocking device being disposed in the block.

4. The cold and hot water mixing apparatus of claim 1, further comprising a device for operating the water flow blocking device and a device for sensing the level of water in the receptacle, the operating device being responsive to a predetermined level of water sensed by the sensing device.

5. The cold and hot water mixing apparatus of claim 4, wherein and the water flow blocking device comprises two rods respectively movable into the conduit means of each inlet valve for blocking the flow of water therethrough and a mobile carrier for the two rods, the water level sensing device comprises pneumatic water level sensing means responsive to the water level and delivering a pneumatic pressure to the operating device corresponding to the sensed level, the operating device being responsive to the delivered pneumatic pressure and including a rocking lever means associated with the mobile carrier and arranged to move the carrier between a first position wherein the rods are outside the conduit means whereby the counterpressure chambers and the mixing chamber are interconnected and a second position wherein the rods are moved into the conduit means, the rocking lever means being disengaged from the associated mobile carrier by actuation of the operating device.

6. The cold and hot water mixing apparatus of claim 5, wherein the operating device comprises a membrane movable by the pneumatic pressure and further comprising an actuating lever having one end arranged adjacent the movable membrane of the operating device for displacement upon movement thereof, and another end arranged adjacent the rocking lever for displacing the rocking lever and the associated mobile carrier upon displacement of the actuating lever.

7. The cold and hot water mixing apparatus of claim 6, wherein the pneumatic water level sensing means comprises conduit means interconnecting the bottom region of the receptacle with a chamber delimited by the movable membrane of the operating device, the conduit means of the pneumatic water level sensing means being filled partially with water in proportion to the water level in the receptacle and thus proportionally increasing the air pressure in the conduit means.

8. The cold and hot water mixing apparatus of claim 6, further comprising a manually operable, spring-biased button arranged for applying a pressure controllable by the spring bias to the actuating lever, the pressure being controllable to permit adjustment of the water level in response to which the actuating lever is displaced.

9. The cold and hot water mixing apparatus of claim 6, wherein the rocking lever has two end positions, one end position moving the mobile carrier to said first position and the other end position moving the mobile carrier to said second position, further comprising a manually operable button to displace the rocking lever into one of the two end positions thereof.

10. The cold and hot water mixing apparatus of claim 5, wherein the mobile carrier comprises a frame comprised of two transverse bars and two struts interconnecting the transverse bars, the two rods being mounted parallel to each other on one of the transverse bars and the rocking lever means being arranged to act upon the other transverse bar to move the carrier.

* * * * *